United States Patent
Fujita et al.

(10) Patent No.: US 11,501,923 B2
(45) Date of Patent: Nov. 15, 2022

(54) MULTILAYER CAPACITOR AND MULTILAYER CAPACITOR ARRAY

(71) Applicant: Murata Manufacturing Co., Ltd., Nagaokakyo (JP)

(72) Inventors: Yukihiro Fujita, Nagaokakyo (JP); Kazuhiro Tabata, Nagaokakyo (JP); Shunsuke Abe, Nagaokakyo (JP); Takayuki Okada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 52 days.

(21) Appl. No.: 17/007,022

(22) Filed: Aug. 31, 2020

(65) Prior Publication Data

US 2021/0082625 A1    Mar. 18, 2021

(30) Foreign Application Priority Data

Sep. 18, 2019   (JP) .............................. JP2019-169899

(51) Int. Cl.
*H01G 4/30*     (2006.01)
*H01G 2/02*     (2006.01)
*H01G 4/12*     (2006.01)
*H01G 4/012*    (2006.01)

(52) U.S. Cl.
CPC ................ *H01G 4/30* (2013.01); *H01G 2/02* (2013.01); *H01G 4/012* (2013.01); *H01G 4/1209* (2013.01)

(58) Field of Classification Search
CPC ........ H01G 4/30; H01G 4/232; H01G 4/1209; H01G 4/012; H01G 2/02

USPC ............. 361/321.3, 301.4, 306.3, 321.1, 303
See application file for complete search history.

(56) References Cited

U.S. PATENT DOCUMENTS

| | | | | |
|---|---|---|---|---|
| 6,606,237 | B1* | 8/2003 | Naito ..................... | H01G 4/232 361/306.3 |
| 8,174,815 | B2* | 5/2012 | Fukudome ............... | H01G 4/12 361/321.2 |
| 2005/0007724 | A1* | 1/2005 | Murakami ............. | H01G 4/232 361/321.2 |
| 2005/0269287 | A1* | 12/2005 | Tsujimura .............. | H01G 4/232 216/13 |

(Continued)

FOREIGN PATENT DOCUMENTS

| | | |
|---|---|---|
| JP | 07-201651 A | 8/1995 |
| JP | 2003-059755 A | 2/2003 |

(Continued)

*Primary Examiner* — Arun Ramaswamy
(74) *Attorney, Agent, or Firm* — Keating & Bennett, LLP

(57) ABSTRACT

A multilayer capacitor includes a capacitor main body including dielectric layers, first inner electrodes, and second inner electrodes that are laminated together, first outer electrodes, second outer electrodes, first via conductors that electrically connect the respective first outer electrodes to the first inner electrodes, and second via conductors that electrically connect the respective second outer electrodes to the second inner electrodes. Through holes are provided in the second inner electrodes, and the first via conductors pass through the through holes. Through holes are provided in the first inner electrodes, and the second via conductors pass through the through holes. The first outer electrodes and the second outer electrodes are not provided on the first principal surface of the capacitor main body and provided only on its second principal surface.

19 Claims, 10 Drawing Sheets

(56) References Cited

U.S. PATENT DOCUMENTS

| | | | |
|---|---|---|---|
| 2008/0037199 A1* | 2/2008 | Fukudome | H01G 4/232 361/321.3 |
| 2008/0251285 A1* | 10/2008 | Sato | H01G 4/33 174/260 |
| 2010/0128411 A1* | 5/2010 | Onishi | H01G 4/232 361/302 |
| 2011/0141660 A1* | 6/2011 | Jeong | H01G 4/12 361/321.4 |
| 2014/0182907 A1* | 7/2014 | Lee | H01G 4/30 174/258 |
| 2015/0062775 A1 | 3/2015 | Shibasaki et al. | |
| 2015/0096795 A1* | 4/2015 | Hong | H01G 2/065 361/301.4 |
| 2016/0128244 A1* | 5/2016 | Sawada | H01G 4/30 206/714 |
| 2018/0233287 A1* | 8/2018 | Seo | H01G 4/30 |
| 2019/0157004 A1* | 5/2019 | Park | H01G 4/232 |

FOREIGN PATENT DOCUMENTS

| | | |
|---|---|---|
| JP | 2004-095685 A | 3/2004 |
| JP | 2004-281957 A | 10/2004 |
| JP | 2015-065414 A | 4/2015 |

\* cited by examiner

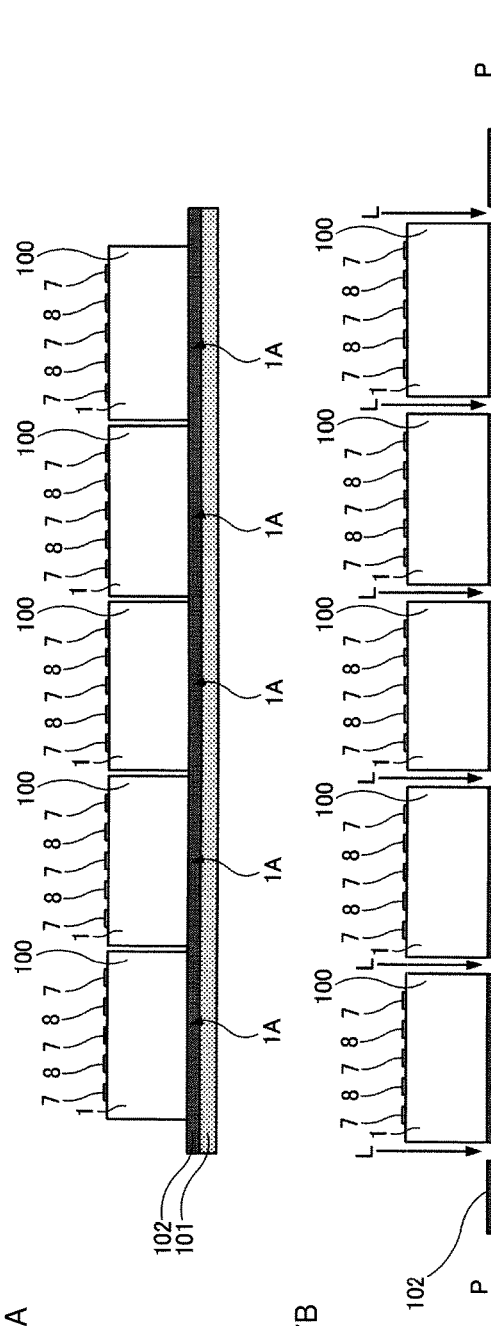
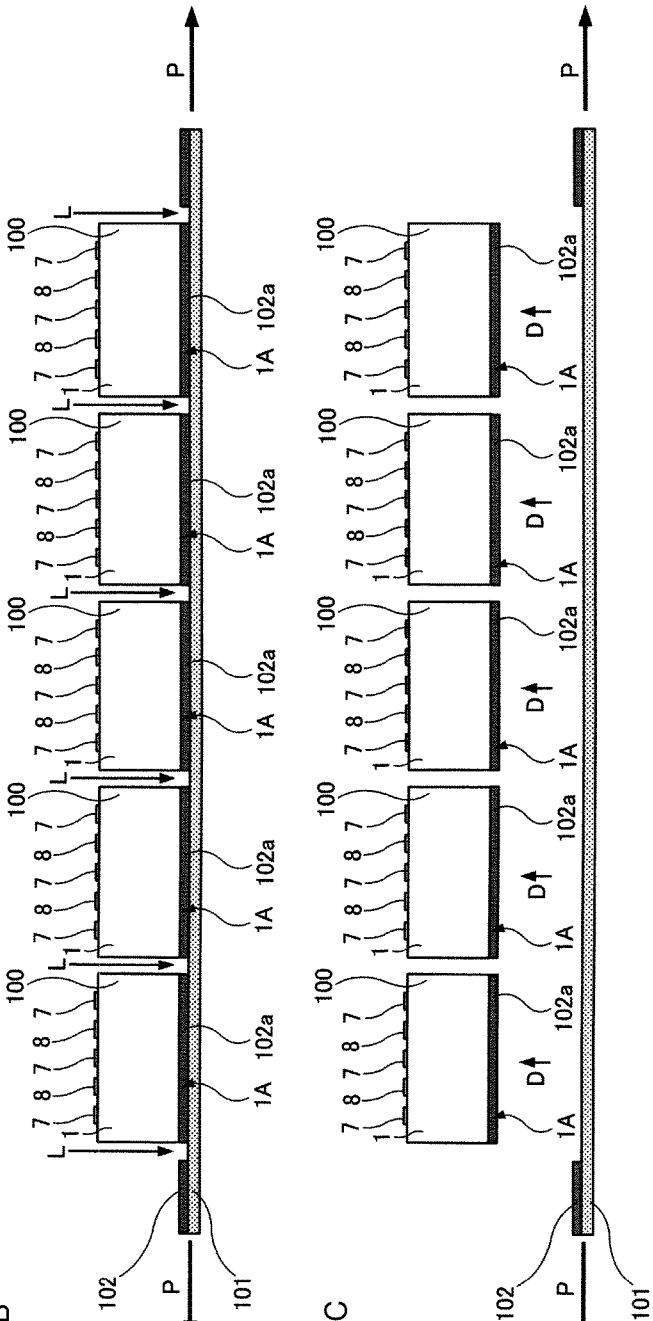

MULTILAYER CAPACITOR AND MULTILAYER CAPACITOR ARRAY

CROSS REFERENCE TO RELATED APPLICATIONS

This application claims the benefit of priority to Japanese Patent Application No. 2019-169899 filed on Sep. 18, 2019. The entire contents of this application are hereby incorporated herein by reference.

BACKGROUND OF THE INVENTION

1. Field of the Invention

The present invention relates to a multilayer capacitor. The present invention also relates to a multilayer capacitor array including a carrier sheet and a plurality of the multilayer capacitors bonded to the carrier sheet.

2. Description of the Related Art

Multilayer capacitors with their ESL (equivalent series inductance) reduced by, for example, increasing the thickness of a current flow path, reducing the length of the current flow path, or causing magnetic fields generated by currents with opposite polarities to cancel out each other are being used for various electronic devices and electronic apparatuses. Japanese Unexamined Patent Application Publication No. 7-201651 discloses a multilayer capacitor with reduced ESL.

The multilayer capacitor disclosed in Japanese Unexamined Patent Application Publication No. 7-201651 includes a capacitor main body prepared by laminating a plurality of dielectric layers, a plurality of first inner electrodes, and a plurality of second inner electrodes together. A first outer electrode is formed on a first principal surface of the capacitor main body, and a second outer electrode is formed on a second principal surface of the capacitor main body. The first outer electrode is connected to the plurality of first inner electrodes through a plurality of first via conductors. The second outer electrode is connected to the plurality of second inner electrodes through a plurality of second via conductors.

In the multilayer capacitor disclosed in Japanese Unexamined Patent Application Publication No. 7-201651, the first outer electrode is formed on the first principal surface of the capacitor main body, and the second outer electrode is formed on the second principal surface of the capacitor main body. Specifically, the first outer electrode and the second outer electrode are formed on the respective opposite principal surfaces of the capacitor main body.

Therefore, when a plurality of the multilayer capacitors disclosed in Japanese Unexamined Patent Application Publication No. 7-201651 are transported for sale or the like, a simple holding method in which the plurality of multilayer capacitors are bonded to one principal surface of a carrier sheet to hold them thereon cannot be used. Specifically, when one principal surface of each multilayer capacitor is bonded to the carrier sheet, the outer electrode (the first outer electrode or the second outer electrode) formed on the principal surface deteriorates. This is the reason that the simple holding method in which the plurality of multilayer capacitors are bonded to one principal surface of the carrier sheet to hold them thereon cannot be used.

Therefore, to hold the multilayer capacitors disclosed in Japanese Unexamined Patent Application Publication No. 7-201651, the following holding method, for example, must be used. A carrier tape including recessed portions on one principal surface is prepared, and the multilayer capacitors are housed in the recessed portions. Then the opening of each recessed portion is sealed with a sealing tape. However, the carrier tape with the recessed portions formed therein is expensive. Moreover, the operation including housing one multilayer capacitor in each of the recessed portions of the carrier tape and sealing each of the recessed portions with a sealing tape is complicated. This is one cause of an increase in the physical distribution cost of the multilayer capacitors.

SUMMARY OF THE INVENTION

Preferred embodiments of the present invention provide multilayer capacitors. When a plurality of the multilayer capacitors are transported for sale or the like, a simple holding method is able to be provided in which the multilayer capacitors are bonded to one principal surface of a carrier sheet to hold them thereon.

A multilayer capacitor according to a preferred embodiment of the present invention includes a capacitor main body including a plurality of dielectric layers, a plurality of first inner electrodes, and a plurality of second inner electrodes, the dielectric layers, the first inner electrodes, and the second inner electrodes being laminated together; a plurality of first outer electrodes and a plurality of second outer electrodes, the first outer electrodes and the second outer electrodes being provided on an outer surface of the capacitor main body; a plurality of first via conductors that electrically connect the respective first outer electrodes to the plurality of first inner electrodes; and a plurality of second via conductors that electrically connect the respective second outer electrodes to the plurality of second inner electrodes, wherein through holes are provided in the second inner electrodes, the first via conductors passing through the through holes with the first via conductors insulated from the second inner electrodes, wherein through holes are provided in the first inner electrodes, the second via conductors passing through the through holes with the second via conductors insulated from the first inner electrodes, wherein the capacitor main body includes a first principal surface and a second principal surface that are opposite outer surfaces of the capacitor main body, and wherein the first outer electrodes and the second outer electrodes are not provided on the first principal surface but are provided only on the second principal surface.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 7A to 7C are front views of a multilayer capacitor array according to the first preferred embodiment of the present invention

DETAILED DESCRIPTION OF THE PREFERRED EMBODIMENTS

Figure 1:
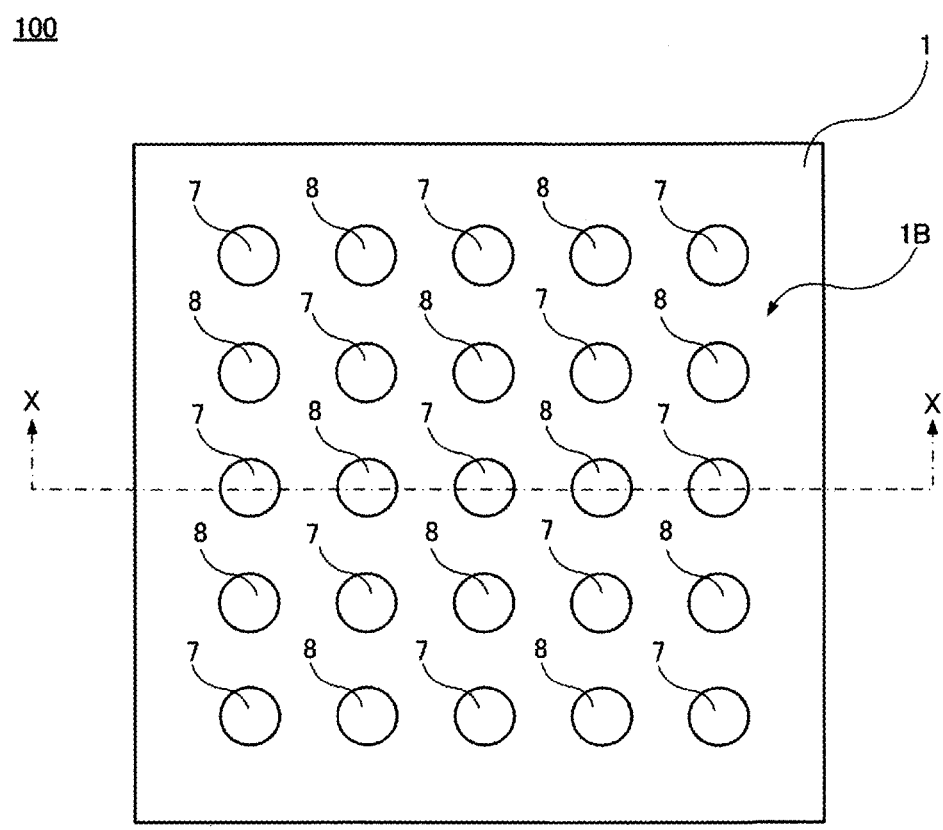
FIG. 1 is a plan view of a multilayer capacitor according to a first preferred embodiment of the present invention.

Preferred embodiments of the present invention will be described with reference to the drawings.

The preferred embodiments are merely exemplary preferred embodiments of the present invention, and the present invention is not limited to the features of the preferred embodiments. Features described in different preferred embodiments may be combined, and the combined features are also included in the present invention. The drawings are provided to facilitate the understanding of the specification and may be schematically drawn in some cases. For example, dimensional ratios of a component or the dimensional ratios between components may not coincide with the dimensional ratios described in the specification. Moreover, a component described in the specification may be omitted in the drawings, or only a reduced number of components may be shown.

First Preferred Embodiment

Multilayer Capacitor 100

Figure 2:
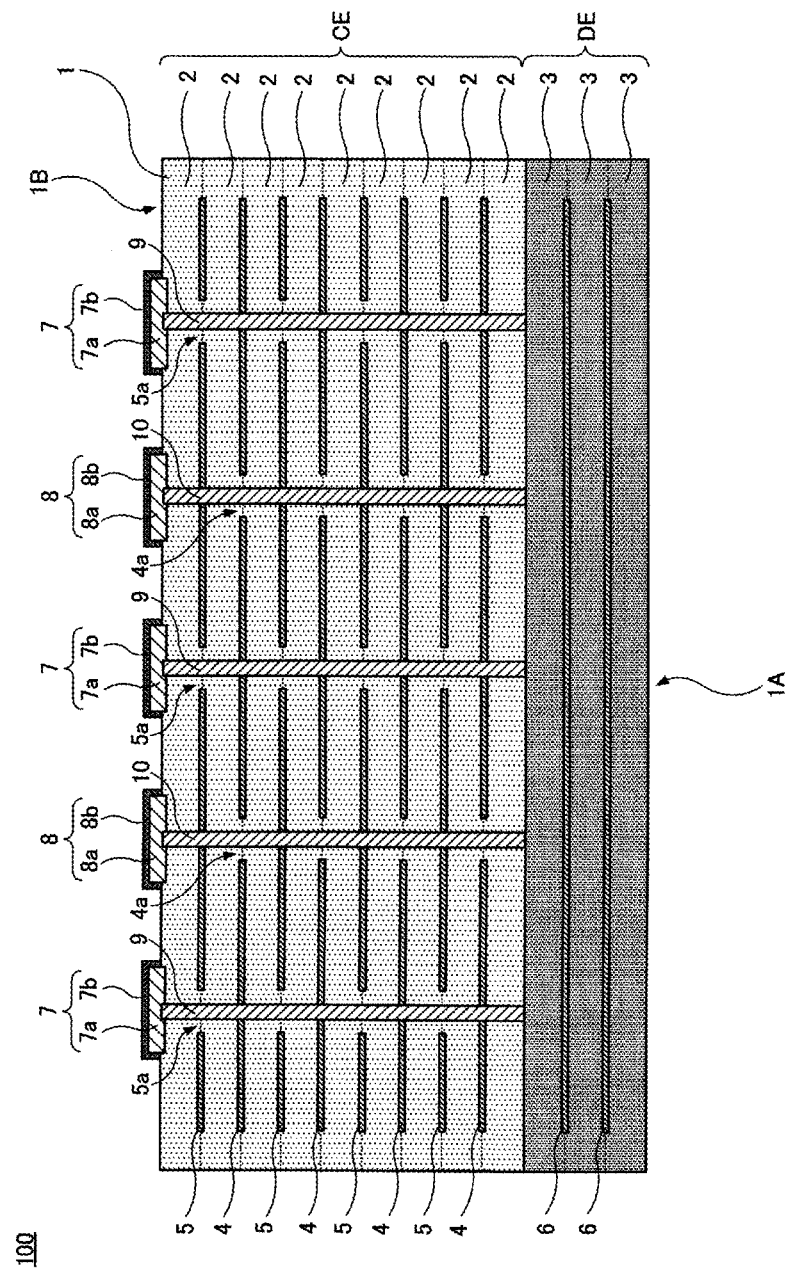
FIG. 2 is a cross-sectional view of the multilayer capacitor.
Figure 3:
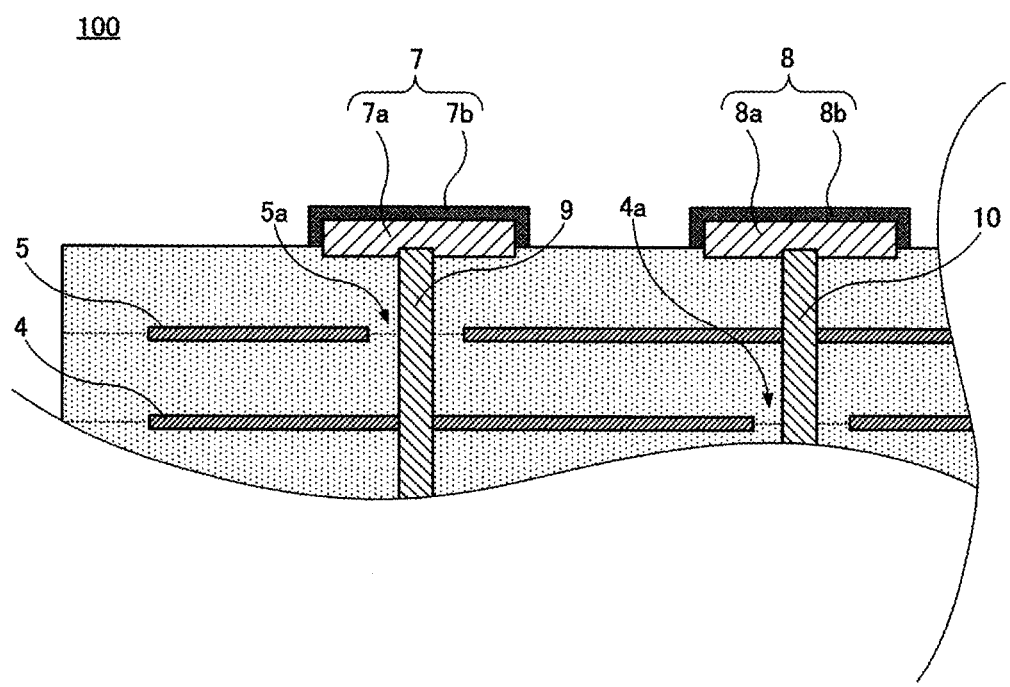
FIG. 3 is a cross-sectional view of a portion of the multilayer capacitor.

FIGS. 1, 2, and 3 show a multilayer capacitor 100 according to a first preferred embodiment of the present invention. FIG. 1 is a plan view of the multilayer capacitor 100. FIG. 2 is a cross-sectional view of the multilayer capacitor 100 and shows a section X-X indicated by dash-dot arrows in FIG. 1. FIG. 3 is a cross-sectional view of a portion of the multilayer capacitor 100.

The multilayer capacitor 100 includes a capacitor main body 1. The capacitor main body 1 includes a capacitance forming region CE in which a plurality of dielectric layers 2, a plurality of first inner electrodes 4, and a plurality of second inner electrodes 5 are laminated together, and a lower protective region DE which is located below the capacitance forming region CE and in which a plurality of dielectric layers 3 and a plurality of dummy inner electrodes 6 are laminated together. The capacitor main body 1 includes a first principal surface 1A defining and functioning as a mounting surface and a second principal surface 1B which is opposite to the first principal surface 1A and on which first outer electrodes 7 and second outer electrodes 8 described later are formed.

In the first preferred embodiment, the dielectric layers 2 and 3 are preferably made of a ceramic material, for example. The composition of the ceramic forming the dielectric layers 2 differs from the composition of the ceramic forming the dielectric layers 3. The ceramics forming the dielectric layers 2 and 3 may each have any composition, and dielectric ceramics including, for example, $BaTiO_3$, $CaTiO_3$, $SrTiO_3$, or $CaZrO_3$ may be included. For example, a material having a high dielectric constant is preferably included in the dielectric layers 2 to provide electrostatic capacitance, for example. A material having high strength or a material that allows the first principal surface 1A defining and functioning as the mounting surface to have increased surface roughness is preferably included in the dielectric layers 3 used as protective layers. The materials of the dielectric layers 2 and 3 are not limited to ceramics, and resins, for example, may be included instead of the ceramics.

The capacitor main body 1 may have any shape and may be, for example, rectangular or substantially rectangular in plan view. The capacitor main body 1 may have any dimensions and may preferably have, for example, a length of about 0.3 mm to about 3.0 mm, a width of about 0.3 mm to about 3.0 mm, and a thickness of about 50 μm to about 200 μm.

Each of the first inner electrodes 4 includes a plurality of through holes 4a provided therein to insert second via conductors 10 described later. Each of the second inner electrodes 5 includes a plurality of through holes 5a provided therein to insert first via conductors 9 described later. No through holes are provided in each of the dummy inner electrodes 6. Electrostatic capacitance is generated between the first inner electrodes 4 and the second inner electrodes 5. The dummy inner electrodes 6 are not included to provide electrostatic capacitance and are instead provided to significantly improve the strength of the lower protective region DE.

Any material may be used for the first inner electrodes 4, the second inner electrodes 5, and dummy inner electrodes 6. In the first preferred embodiment, Ni is preferably used as a main component, for example. However, instead of Ni, a different metal, for example, Cu, Ag, Pd, or Au may be used. Ni, Cu, Ag, Pd, Au, or the like may be an alloy with another metal (e.g., an Ag—Pd alloy).

The first inner electrodes 4, the second inner electrodes 5, and the dummy inner electrodes 6 may have any thickness. They may preferably have a thickness of, for example, about 0.3 μm to about 1.0 μm. Any number of first inner electrodes 4 and any number of second inner electrodes 5 may be provided. However, the total number of these electrodes 4 and 5 may preferably be, for example, about 10 to about 150. The number of dummy inner electrodes 6 may be appropriately set.

The plurality of first outer electrodes 7 and the plurality of second outer electrodes 8 are provided on the second principal surface 1B of the capacitor main body 1. The plurality of first outer electrodes 7 and the plurality of second outer electrodes 8 provided on the second principal surface 1B of the capacitor main body 1 are arranged in rows and columns of a matrix. In the first preferred embodiment, first outer electrodes 7 and second outer electrodes 8 are alternately provided in each of the rows and columns.

Each of the first outer electrodes 7 includes a base layer 7a and a plating layer 7b provided on the outer surface of the base layer 7a. Each of the second outer electrodes 8 includes a base layer 8a and a plating layer 8b provided on the outer surface of the base layer 8a. The first outer electrodes 7 and the second outer electrodes 8 may have any structure, may be made of any suitable material, and may be designed freely. The first outer electrodes 7 and the second outer electrodes 8 may have any shape and may be circular or substantially circular in plan view, for example. The first outer electrodes 7 and the second outer electrodes 8 may have any size and may be appropriately designed with the first outer electrodes 7 and the second outer electrodes 8 insulated from each other.

In the first preferred embodiment, Ni, for example, is preferably included as a main component of the base layers 7a and 8a. However, instead of Ni, a different metal, for example, Cu, Ag, Pd, or Au may be included. Ni, Cu, Ag, Pd, Au, or the like may be an alloy with another metal (e.g., an Ag—Pd alloy). In the first preferred embodiment, the plating layers 7b and 8b are preferably Cu plating layers, for example. However, instead of the Cu plating, plating with a different metal, for example, Ag, Au, Ni, Pd, Au, or an Ag—Pd alloy may be used. A plurality of types of plating layers may be provided.

Any number of first outer electrodes 7 and any number of second outer electrodes 8 may be provided. The number of first outer electrodes 7 and the number of second outer electrodes 8 may each preferably be about 2 to about 300, for example. The number of first outer electrodes 7 and the number of second outer electrodes 8 are preferably the same, but they may be different.

The base layers 7a and 8a may have any thickness, and their thickness may preferably be about 2 µm to about 10 µm, for example. The plating layers 7b and 8b may have any thickness, and their thickness may preferably be about 2 µm to about 10 µm, for example.

The first outer electrodes 7 are electrically connected to the plurality of first inner electrodes 4 through the respective first via conductors 9. The second outer electrodes 8 are connected to the plurality of second inner electrodes 5 through the respective second via conductors 10.

The first via conductors 9 pass through holes 5a provided in the second inner electrodes 5 while being insulated from the second inner electrodes 5. The second via conductors 10 pass through holes 4a provided in the first inner electrodes 4 while being insulated from the first inner electrodes 4.

Any material may be used for the first via conductors 9 and the second via conductors 10. In the first preferred embodiment, Ni is preferably included as a main component. However, instead of Ni, a different metal, for example, Cu, Ag, Pd, or Au may be included. Ni, Cu, Ag, Pd, Au, or the like may be an alloy with another metal (e.g., an Ag—Pd alloy).

The first via conductors 9 and the second via conductors 10 may have any shape and may be cylindrical or substantially cylindrical, for example. The first via conductors 9 and the second via conductors 10 may have any diameter, and their diameter may preferably be about 30 µm to about 150 µm, for example.

Inside the capacitor main body 1, the distance between a first via conductor 9 and a second via conductor 10 that are located closest to each other is preferably about 400 µm or less, for example. This is because a large number of first via conductors 9 and a large number of second via conductors 10 are able be provided in the capacitor main body 1.

In the multilayer capacitor 100, electrostatic capacitance is generated between the first inner electrodes 4 and the second inner electrodes 5. The first outer electrodes 7 and the second outer electrodes 8 that are to be connected to an external electronic circuit are electrically connected to the first inner electrodes 4 and the second inner electrodes 5, respectively, through the first via conductors 9 and the second via conductors 10, respectively.

The ESL of the multilayer capacitor 100 is low because its current flow path includes a large number of first via conductors 9 connected in parallel and a large number of second via conductors 10 connected in parallel and the length of the current flow path is significantly reduced. In addition, the ESL of the multilayer capacitor 100 is low because the magnetic field generated by a current flowing through the first via conductors 9 and the magnetic field generated by a current flowing through the second via conductors 10 cancel each other out.

In the multilayer capacitor 100, the surface roughness of the first principal surface 1A defining and functioning as the mounting surface is larger than the surface roughness of the second principal surface 1B. Therefore, when the first principal surface 1A of the multilayer capacitor 100 is bonded to, for example, a substrate, the adhesion between the multilayer capacitor 100 and the substrate is large. In the first preferred embodiment, a ceramic whose surface roughness after firing is larger than the surface roughness of the ceramic included in the dielectric layers 2 in the capacitance forming region CE is preferably used for the dielectric layers 3 in the lower protective region DE, and the surface roughness of the first principal surface 1A is thereby larger than the surface roughness of the second principal surface 1B. However, the method to form the first principal surface 1A having larger surface roughness than the second principal surface 1B is not limited to the method described above. For example, when the capacitor main body 1 is produced by firing, the first principal surface 1A is brought into contact with a sagger having large surface roughness to thus allow the first principal surface 1A to have larger surface roughness than the second principal surface 1B. Alternatively, sand blasting or barrel processing may be used to increase the surface roughness of the first principal surface 1A such that the surface roughness of the first principal surface 1A is larger than the surface roughness of the second principal surface 1B.

As shown in FIG. 3, in the multilayer capacitor 100, the first outer electrodes 7 and the second outer electrodes 8 are partially embedded in the second principal surface 1B of the capacitor main body 1. The first via conductors 9 are provided with their end portions embedded in the bottom surfaces of the base layers 7a of the first outer electrodes 7, and the second via conductors 10 are provided with their end portions embedded in the bottom surfaces of the base layers 8a of the second outer electrodes 8.

Therefore, in the multilayer capacitor 100, even when stress is applied to the first outer electrodes 7 and the second outer electrodes 8, the first outer electrodes 7 and the second outer electrodes 8 are unlikely to break. As an example, if the first outer electrodes 7 and the second outer electrodes 8 are not partially embedded in the second principal surface 1B of the capacitor main body 1, when stress is applied to the first outer electrodes 7 and the second outer electrodes 8, the first outer electrodes 7 and the second outer electrodes 8 may separate from the second principal surface 1B of the capacitor main body 1. As another example, if the end portions of the first via conductors 9 and the end portions of the second via conductors 10 are not embedded in the bottom surfaces of the first outer electrodes 7 and the bottom surfaces of the second outer electrodes 8, respectively, when stress is applied to the first outer electrodes 7, the connections between the first via conductors 9 and the first outer electrodes 7 may be broken, and the electrical connections between the first via conductors 9 and the first outer electrodes may be lost. When stress is applied to the second outer electrodes 8, the connections between the second via conductors 10 and the second outer electrodes 8 may be broken, and the electrical connections between the second via conductors 10 and the second outer electrodes 8 may be lost. However, the multilayer capacitor 100 has the above-described structure. Therefore, even when stress is applied to the first outer electrodes 7, the first outer electrodes 7 are unlikely to break. Even when stress is applied to the second outer electrodes 8, the second outer electrodes 8 are unlikely to break. Moreover, even when stress is applied to the first outer electrodes 7, the electrical connections between the first via conductors 9 and the first outer electrodes 7 are unlikely to be lost. Even when stress is applied to the second outer electrodes 8, the electrical connections between the second via conductors 10 and the second outer electrodes 8 are unlikely to be lost.

In the multilayer capacitor 100, the first via conductors 9 and the second via conductors 10 are provided in holes provided in the capacitance forming region CE. Since the lower protective region DE is provided below the capacitance forming region CE, these holes are not closed-end holes but may be through holes. Generally, when a laser beam, for example, is applied to form a hole, a through hole is able be formed much more easily than a closed end hole. This is because it is unnecessary to stop the application of the laser beam at an intermediate point during the formation of the hole. An example of a method to produce the multilayer capacitor 100 will be described later. In the production method, the through holes that form the first via conductors 9 and the through holes that form second via conductors 10 are formed in the capacitance forming region CE, and then the lower protective region DE is joined below the capacitance forming region CE (these regions in the form of green sheets are joined together). In the multilayer capacitor 100, since the lower protective region DE is formed below the capacitance forming region CE, the holes that form the first via conductors 9 and the holes that form the second via conductors 10 that are formed in the capacitance forming region CE may be through holes, and the multilayer capacitor 100 is able to be easily produced.

In the multilayer capacitor 100, the dummy inner electrodes 6 are provided in the lower protective region DE of the capacitor main body 1. In the multilayer capacitor 100, the dummy inner electrodes 6 significantly improve the strength of the lower protective region DE of the capacitor main body 1.

In the multilayer capacitor 100, the first outer electrodes 7 and the second outer electrodes 8 are not provided on the first principal surface 1A but are provided only on the second principal surface 1B. Therefore, when a plurality of the multilayer capacitors 100 are transported for sale or the like, a simple holding method is able to be provided in which the first principal surfaces 1A of the multilayer capacitors 100 are bonded to a carrier sheet to hold them thereon. A multilayer capacitor array in which a plurality of the multilayer capacitors 100 are bonded to a carrier sheet to hold them thereon will be described later.

Example of Method for Producing Multilayer Capacitor 100

The multilayer capacitor 100 is able to be produced, for example, by a production method shown in FIGS. 4A to 6I. FIGS. 4A to 6I are cross-sectional views showing steps performed in the example of the method to produce the multilayer capacitor 100.

First, ceramic green sheets are produced in order to form the dielectric layers 2 and 3 of the capacitor main body 1. Each of the green sheets produced is a mother green sheet that produces a large number of multilayer capacitors 100 and including a large number of portions provided as individual green sheets.

Although not shown, a dielectric ceramic powder, a binder resin, a solvent, or the like are prepared and wet-mixed to produce a ceramic slurry. In the first preferred embodiment, the composition of the ceramic for the dielectric layers 2 differs from the composition of the ceramic for the dielectric layers 3, and therefore two ceramic slurries are produced.

Next, the ceramic slurries are applied to carrier films by, for example, a die coater, a gravure coater, a micro gravure coater, or the like to form sheets, and the sheets are dried to produce mother green sheets 72 and 73. The mother green sheets 72 form the dielectric layers 2. The mother green sheets 73 form the dielectric layers 3.

Next, a conductive paste prepared in advance is applied (e.g., by printing) to a principal surface of each mother green sheet 72 to thus form a conductive paste pattern 74 having a predetermined shape and forming the first inner electrodes 4 or a conductive paste pattern 75 having a predetermined shape and forming the second inner electrodes 5. Moreover, the conductive paste is applied to a principal surface of each mother green sheet 73 to form a conductive paste pattern 76 having a predetermined shape and forming the dummy inner electrodes 6.

Figure 4A:
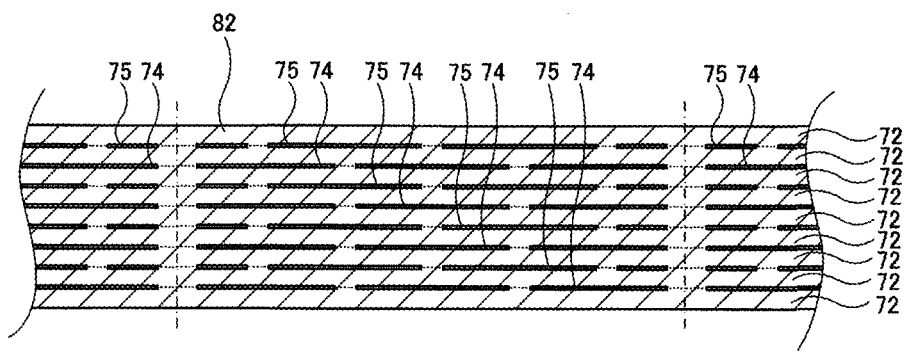
FIGS. 4A to 4C are cross-sectional views showing steps performed in a method to produce the multilayer capacitor.

Next, as shown in FIG. 4A, a plurality of the mother green sheets 72 each having the conductive paste pattern 74 formed thereon and a plurality of the mother green sheets 72 each having the conductive paste pattern 75 formed thereon are stacked and integrated under the application of pressure to thereby produce a first mother green sheet multilayer body 82.

Figure 4B:
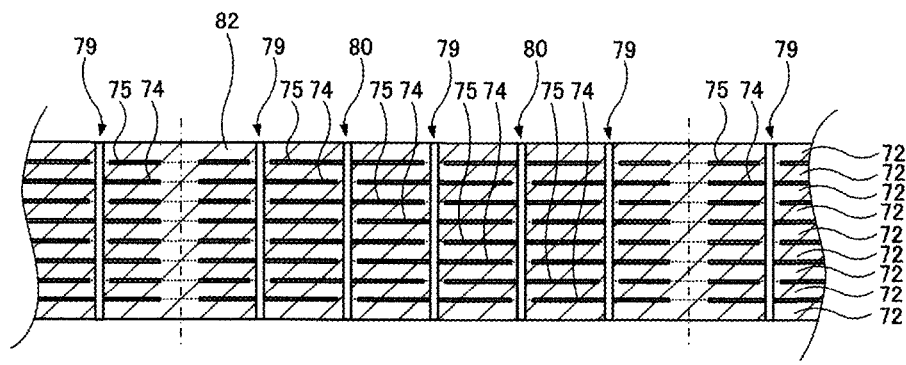

Next, as shown in FIG. 4B, through holes 79 that form the first via conductors 9 and through holes 80 that form the second via conductors 10 are formed in the first mother green sheet multilayer body 82. The through holes 79 and 80 are formed, for example, by applying a laser beam.

Figure 4C:
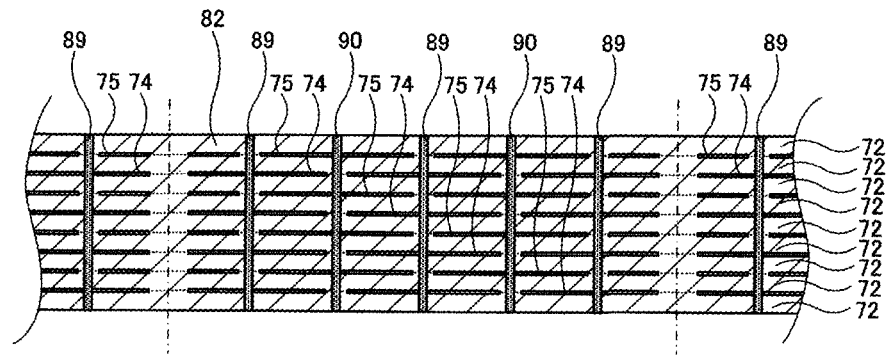

Next, as shown in FIG. 4C, the through holes 79 in the first mother green sheet multilayer body 82 are filled with a conductive paste 89 to form the first via conductors 9. Moreover, the through holes 80 in the first mother green sheet multilayer body 82 are filled with a conductive paste 90 to form the second via conductors 10.

Figure 5D:
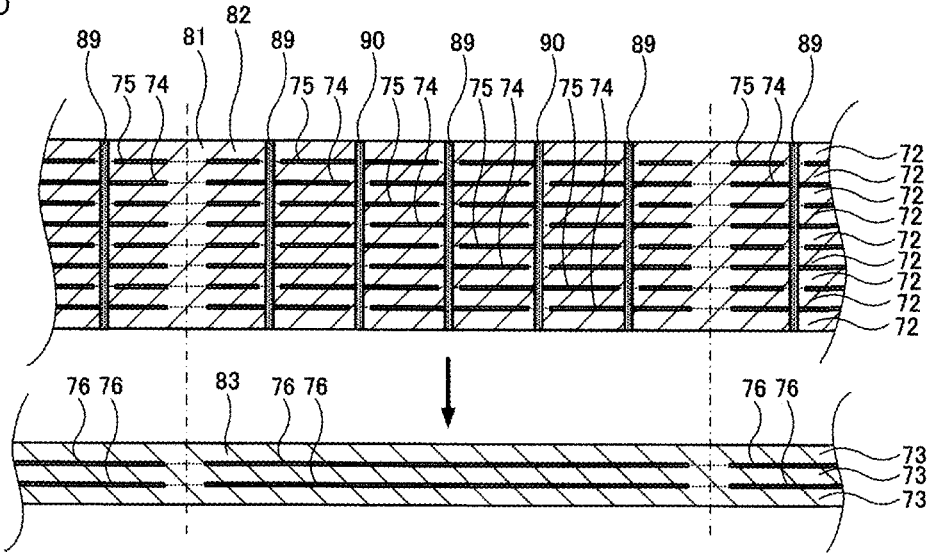
FIGS. 5D to 5F are cross-sectional views subsequent to FIG. 4C and showing steps performed in the method to produce the multilayer capacitor.

Next, as shown in FIG. 5D, a plurality of the mother green sheets 73 each having the conductive paste pattern 76 formed thereon are stacked and integrated under the application of pressure to thus produce a second mother green sheet multilayer body 83. Then the first mother green sheet multilayer body 82 is located above the second mother green sheet multilayer body 83.

Figure 5E:
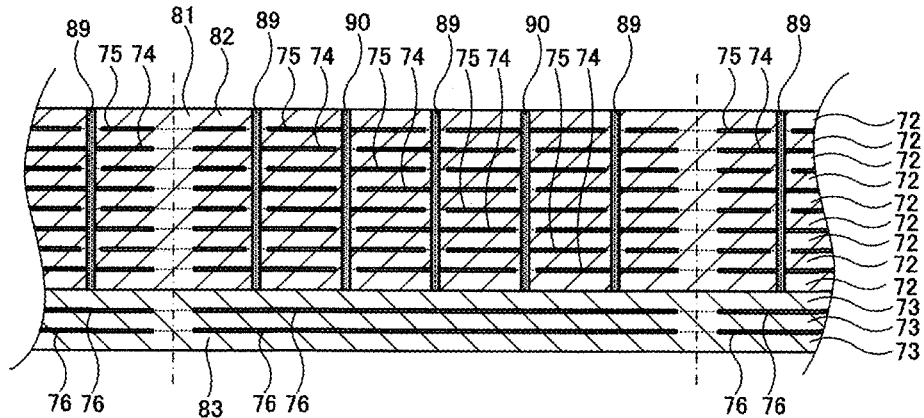

Next, as shown in FIG. 5E, the first mother green sheet multilayer body 82 is stacked on the second mother green sheet multilayer body 83 and integrated therewith under the application of pressure to thereby produce a mother green sheet multilayer body 81 including the first mother green sheet multilayer body 82 and the second mother green sheet multilayer body 83 integrated with each other.

Figure 5F:
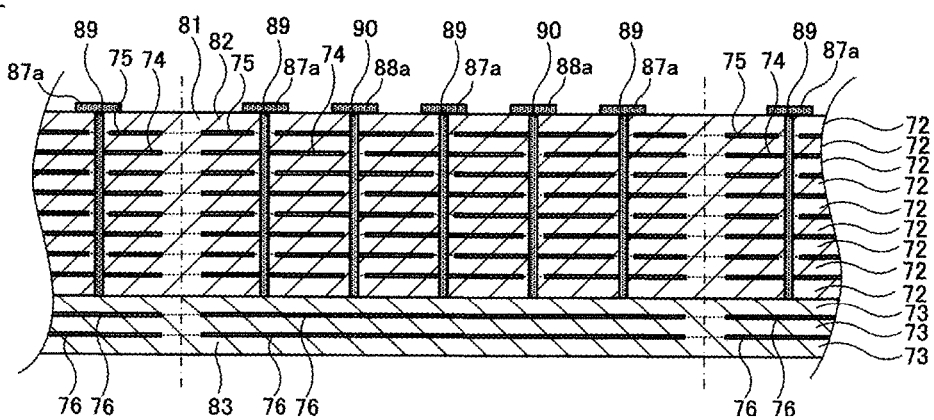

Next, as shown in FIG. 5F, a conductive paste pattern 87a that forms the base layer 7a of each first outer electrode 7 and a conductive paste pattern 88a that forms the base layer 8a of each second outer electrode 8 are formed by printing on the upper principal surface of the mother green sheet multilayer body 81.

Figure 6G:
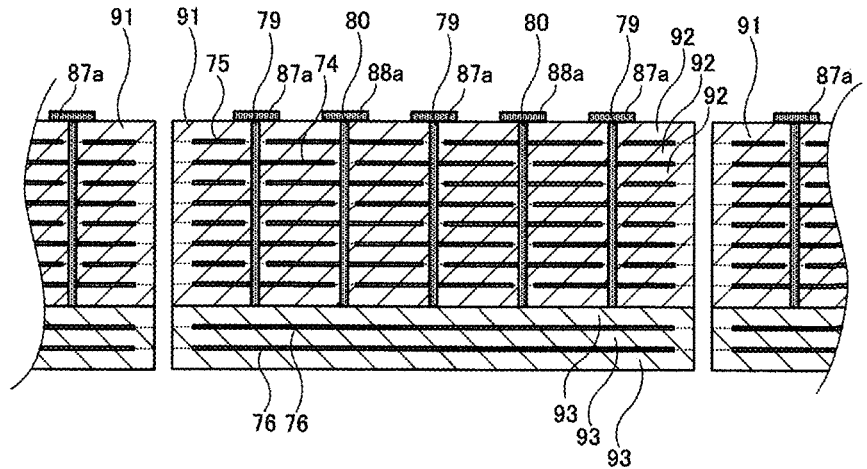
FIGS. 6G to 6I are cross-sectional views subsequent to FIG. 5F and showing steps performed in the method to produce the multilayer capacitor.

Next, as shown in FIG. 6G, the mother green sheet multilayer body 81 is cut into a plurality of individual green sheet multilayer bodies 91. The mother green sheets 72 are thereby cut into green sheets 92, and the mother green sheets 73 are cut into green sheets 93.

Figure 6H:
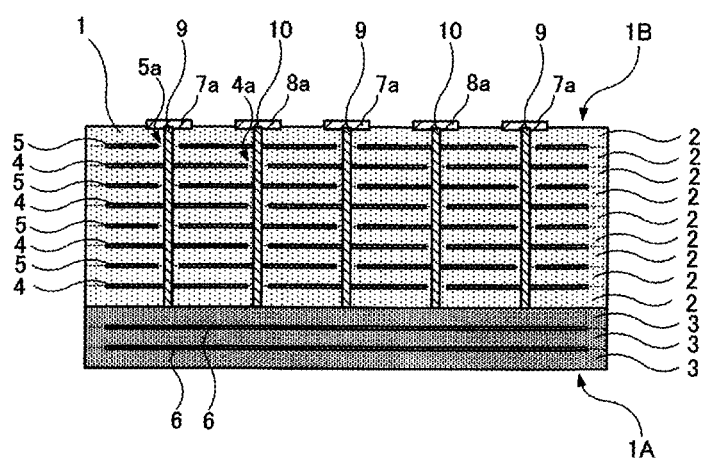

Next, as shown in FIG. 6H, a green sheet multilayer body 91 is fired with a prescribed profile. The green sheet multilayer body 91 is thereby fired and becomes the capacitor main body 1. The green sheets 92 become the dielectric layers 2, and the green sheets 93 become the dielectric layers 3. The conductive paste patterns 74 become the first inner electrodes 4, and the conductive pastes patterns 75 become the second inner electrodes 5. The conductive paste patterns 76 become the dummy inner electrodes 6. The conductive paste 89 becomes the first via conductors 9, and the conductive paste 90 becomes the second via conductors 10. The conductive paste pattern 87a becomes the base layers 7a of the first outer electrodes 7, and the conductive paste pattern 88a becomes the base layers 8a of the second outer electrodes 8.

In the fired capacitor main body 1, the plurality of through holes 5a in the second inner electrodes 5 are present directly below the base layers 7a of the first outer electrodes 7. Accordingly, the base layers 7a of the first outer electrodes 7 are able to be partially embedded in the second principal surface 1B of the capacitor main body 1. Therefore, end portions of the first via conductors 9 are embedded in the bottom surfaces of the base layers 7a of the first outer electrodes 7. Moreover, the plurality of through holes 4a in the first inner electrodes 4 are present directly below the base layers 8a of the second outer electrodes 8. Accordingly, the base layers 8a of the second outer electrodes 8 are able to be partially embedded in the second principal surface 1B of the capacitor main body 1. Therefore, end portions of the second via conductors 10 are embedded in the bottom surfaces of the base layers 8a of the second outer electrodes 8.

Figure 6I:
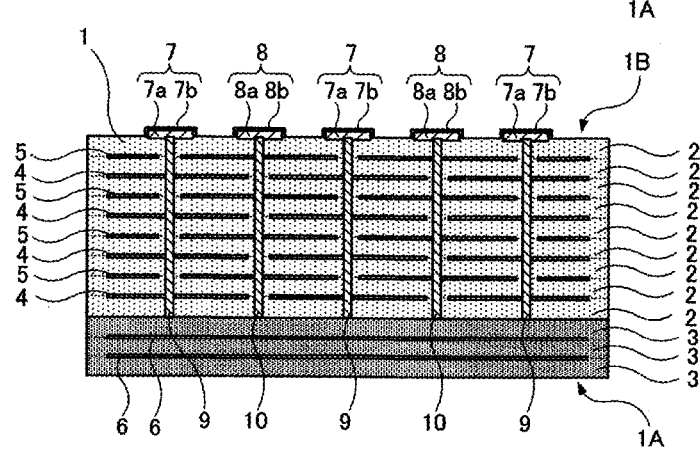

Next, as shown in FIG. 6I, the plating layer 7b is formed on the outer surface of the base layer 7a of each first outer electrode 7, and the plating layer 8b is formed on the outer surface of the base layer 8a of each second outer electrode 8. The multilayer capacitor 100 according to the first preferred embodiment is thereby completed.

Multilayer Capacitor Array 200

FIG. 7A shows a multilayer capacitor array 200 according to the first preferred embodiment. FIG. 7A is a front view of the multilayer capacitor array 200. In the present application, the multilayer capacitor array is an array of a plurality of multilayer capacitors and is, for example, a product in which a plurality of multilayer capacitors are bonded to a carrier sheet. The multilayer capacitor array stores and transports the plurality of multilayer capacitor for sale or the like.

The multilayer capacitor array 200 includes a carrier sheet 101. The carrier sheet 101 is stretchable in plane directions. Any material may be used for the carrier sheet 101, and a resin, for example, may preferably be used.

An adhesive layer is provided on a principal surface of the carrier sheet 101. In the first preferred embodiment, a commercial adhesive sheet 102 having adhesiveness on both sides is preferably used for the adhesive layer. The adhesive sheet 102 also is stretchable in plane directions. Any method may be applied to form the adhesive layer. For example, an adhesive may be used instead of the adhesive sheet 102.

A plurality of the multilayer capacitors 100 according to the first preferred embodiment are bonded to the adhesive sheet 102. The first principal surfaces 1A of the capacitor main bodies 1 of the multilayer capacitors 100 are bonded to the adhesive sheet 102. Although not clear from FIG. 7A, the plurality of multilayer capacitor 100 are provided in rows and columns on the adhesive sheet 102 and bonded in a matrix configuration.

In the first preferred embodiment, the plurality of multilayer capacitors 100 are bonded to the adhesive sheet 102 and spaced apart from each other at regular intervals. This is to prevent the multilayer capacitors 100 from coming into contact with each other and being broken. Instead of this, the plurality of multilayer capacitors 100 may be bonded to the adhesive sheet 102 with no gaps therebetween.

The multilayer capacitor array 200 according to the first preferred embodiment has a simple structure and is able to be produced very easily. The carrier sheet 101 and the adhesive sheet 102 of the multilayer capacitor array 200 are both inexpensive, and therefore the multilayer capacitor array 200 is able to be produced at very low cost except for the cost of producing the multilayer capacitor 100.

FIGS. 7B and 7C show a method to detach the multilayer capacitors 100 from the multilayer capacitor array 200.

First, as shown in FIG. 7B, the carrier sheet 101 and the adhesive sheet 102 are stretched in longitudinal and transverse directions as shown by arrows P. The gaps between the plurality of multilayer capacitors 100 are thereby increased.

Then, as again shown in FIG. 7B, portions of the adhesive sheet 102 that appear in the increased gaps between the plurality of multilayer capacitor 100 are, for example, irradiated with a laser beam as shown by arrows L to remove these portions, and the adhesive sheet 102 is thus cut into individual adhesive sheets 102a each including one multilayer capacitor 100.

Next, as shown in FIG. 7C, each multilayer capacitor 100 is pulled upward from the carrier sheet 101 to detach the multilayer capacitor 100 from the carrier sheet 101 as shown by arrows D. In each multilayer capacitor 100, its first principal surface 1A has large surface roughness. Therefore, the multilayer capacitor 100 is detached from the carrier sheet 101 with the cut adhesive sheet 102a adhering to the first principal surface 1A of the multilayer capacitor 100. The cut adhesive sheet 102a adhering to the first principal surface 1A may mount (fix) the multilayer capacitor 100.

Second Preferred Embodiment

Figure 8:
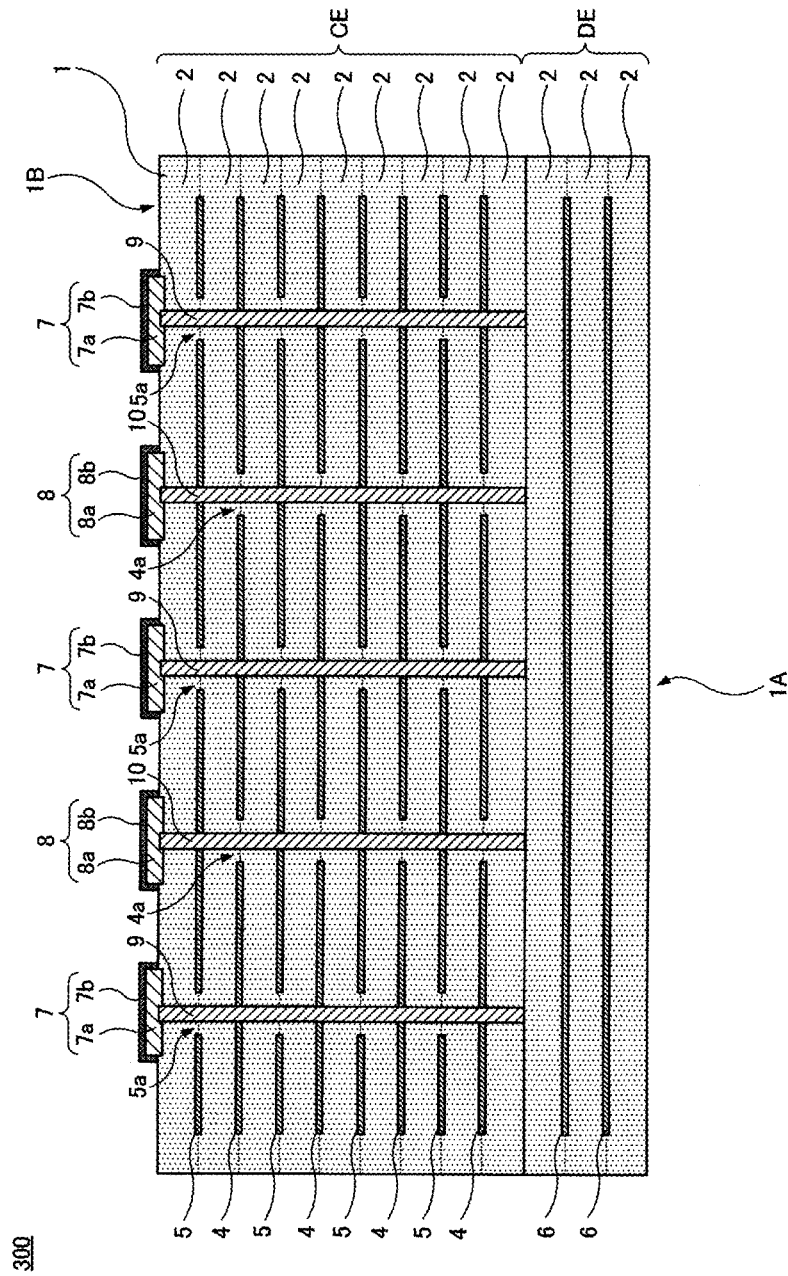
FIG. 8 is a cross-sectional view of a multilayer capacitor according to a second preferred embodiment of the present invention

FIG. 8 shows a multilayer capacitor 300 according to a second preferred embodiment of the present invention. FIG. 8 is a cross-sectional view of the multilayer capacitor 300.

The multilayer capacitor 300 according to the second preferred embodiment has a structure provided by partially modifying the structure of the multilayer capacitor 100 according to the first preferred embodiment described above. Specifically, in the multilayer capacitor 100, the composition of the ceramic used for the dielectric layers 2 in the capacitance forming region CE differs from the composition of the ceramic used for the dielectric layers 3 in the lower protective region DE. A different structure is provided for the multilayer capacitor 300. Specifically, the dielectric layers 2 used for the capacitance forming region CE are also used for the lower protective region DE.

In the multilayer capacitor 300, when the capacitor main body 1 is produced by firing, the first principal surface 1A is brought into contact with a sagger having large surface roughness, and this allows the first principal surface 1A to have larger surface roughness than the second principal surface 1B. However, as described above, sand blasting or barrel processing may be used instead of the method described above to increase the surface roughness of the first principal surface 1A such that the surface roughness of the first principal surface 1A is larger than the surface roughness of the second principal surface 1B.

Third Preferred Embodiment

Figure 9:
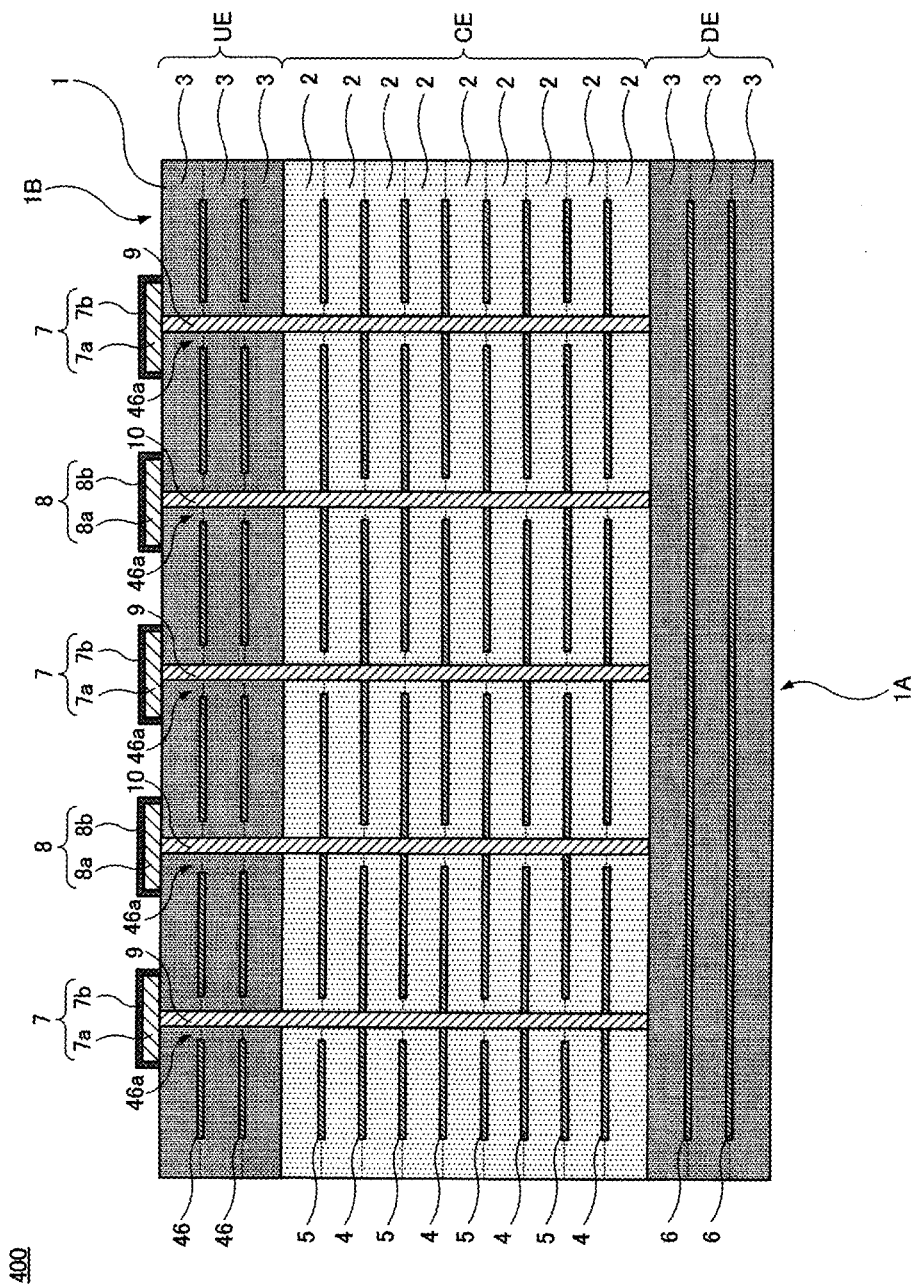
FIG. 9 is a cross-sectional view of a multilayer capacitor according to a third preferred embodiment of the present invention

FIG. 9 shows a multilayer capacitor 400 according to a third preferred embodiment of the present invention. FIG. 9 is a cross-sectional view of the multilayer capacitor 400.

The multilayer capacitor 400 according to the third preferred embodiment has a structure provided by adding a component to the multilayer capacitor 100 according to the first preferred embodiment described above. Specifically, in the multilayer capacitor 100, the lower protective region DE is provided below the capacitance forming region CE. The multilayer capacitor 400 includes, in addition to the lower protective region DE, an upper protective region UE provided above the capacitance forming region CE.

The upper protective region UE includes a plurality of dielectric layers 3 and a plurality of dummy inner electrodes 46 that are laminated together. A plurality of through holes 46a to insert of the first via conductors 9 and the second via conductors 10 are provided in the dummy inner electrodes 46.

Fourth Preferred Embodiment

Figure 10:
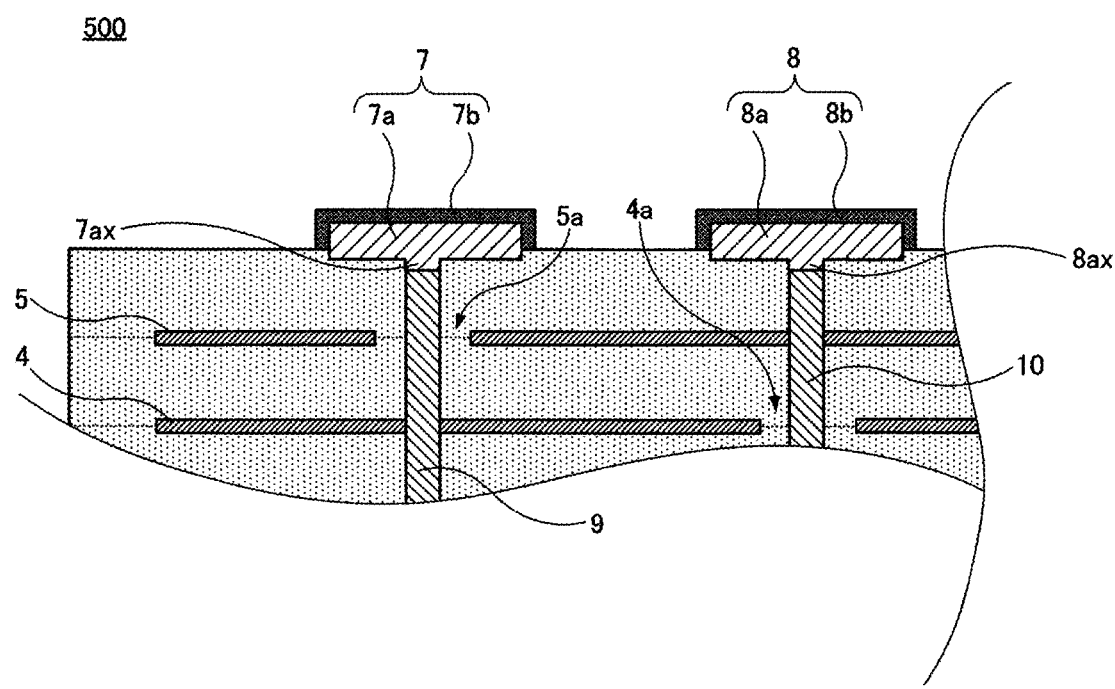
FIG. 10 is a cross-sectional view of a portion of a multilayer capacitor according to a fourth preferred embodiment of the present invention.

FIG. 10 shows a multilayer capacitor 500 according to a fourth preferred embodiment of the present invention. FIG. 10 is a cross-sectional view of the multilayer capacitor 500.

The multilayer capacitor 500 according to the fourth preferred embodiment has a structure provided by partially modifying the structure of the multilayer capacitor 100 according to the first preferred embodiment described above. Specifically, in the multilayer capacitor 100, end portions of the first via conductors 9 are embedded in the bottom surfaces of the base layers 7a of the first outer electrodes 7. Moreover, end portions of the second via conductors 10 are embedded in the bottom surfaces of the base layers 8a of the second outer electrodes 8. The multilayer capacitor 500 has a modified structure. Specifically, a protrusion 7ax is provided on a portion of the bottom surface of the base layer 7a of each first outer electrodes 7 and embedded in a hole in which a corresponding first via conductor 9 is formed. The protrusion 7ax is electrically connected to the first via conductor 9. Moreover, a protrusion 8ax is provided on a portion of the bottom surface of the base layer 8a of each second outer electrode 8 and embedded in a hole in which a corresponding second via conductor 10 is provided. The protrusion 8ax is electrically connected to the second via conductor 10.

In the multilayer capacitor 500 according to the fourth preferred embodiment, as in the multilayer capacitor 100, even when stress is applied to the first outer electrodes 7, the connections between the first via conductors 9 and the first outer electrodes 7 are unlikely to be broken. Moreover, even when stress is applied to the second outer electrodes 8, the connections between the second via conductors 10 and the second outer electrodes 8 are unlikely to be broken.

The multilayer capacitors 100, 300, 400, and 500 according to the first to fourth preferred embodiments and the multilayer capacitor array 200 according to the first preferred embodiment have been described. However, the present invention is not limited to the features described above, and various modifications may be made within the scope of the invention.

For example, in the multilayer capacitor 100, the plurality of first outer electrodes 7 and the plurality of second outer electrodes 8 are provided in rows and columns of a matrix on the second principal surface 1B of the capacitor main body 1, and the first outer electrodes 7 and the second outer electrodes 8 are provided alternately in each of the rows and columns. However, the first outer electrodes 7 and the second outer electrodes 8 may be freely arranged. For example, only first outer electrodes 7 may be provided in the first row, and only second outer electrodes 8 may be provided in the second row. Then rows including only first outer electrodes 7 and rows including only second outer electrodes 8 may be provided alternately.

In the multilayer capacitor 100, each first outer electrode 7 includes the base layer 7a and the plating layer 7b, and each second outer electrode 8 includes the base layer 8a and the plating layer 8b. However, the first outer electrodes 7 and the second outer electrodes 8 may have any structure. Each electrode may include only the base layer (the layer formed by baking the conductive paste applied) or only the plating layer, for example.

The multilayer capacitor according to the one preferred embodiment of the present invention is as described in "SUMMARY OF THE INVENTION."

In this multilayer capacitor, the dielectric layers are preferably ceramic layers, for example. In this case, a ceramic firing technique may be used to produce the multilayer capacitor.

Inside the capacitor main body, the distance between one of the first via conductors and one of the second via conductors that are located closest to each other is preferably about 400 μm or less, for example. In this case, a large number of first outer electrodes and a large number of second outer electrodes are able to be formed in the capacitor main body. When a large number of first outer electrodes and a large number of second outer electrodes are able to be formed, the design flexibility of an electronic device or an electronic apparatus that includes the multilayer capacitor is able to be increased. When a large number of first outer electrodes and a large number of second outer electrodes are able to be formed, the ESL of the multilayer capacitor is able to be further reduced.

Preferably, for example, the first outer electrodes are partially embedded in the second principal surface, end portions of the first via conductors that are located on the second principal surface side of the capacitor main body are embedded in the bottom surfaces of the respective first outer electrodes, the second outer electrodes are partially embedded in the second principal surface, and end portions of the second via conductors that are located on the second principal surface side of the capacitor main body are embedded in the bottom surfaces of respective the second outer electrodes. Preferably, for example, the first outer electrodes are partially embedded in the second principal surface, a protrusion is provided on a portion of the bottom surface of each of the first outer electrodes and embedded in a hole in which a corresponding one of the first via conductors is provided, the protrusion being electrically connected to the corresponding one of the first via conductors, the second outer electrodes are partially embedded in the second principal surface, and a protrusion is provided on a portion of the bottom surface of each of the second outer electrodes and embedded in a hole in which a corresponding one of the second via conductors is provided, the protrusion being electrically connected to the corresponding one of the second via conductors. In these cases, even when stress is applied to the first outer electrodes and the second outer electrodes, the first outer electrodes and the second outer electrodes are unlikely to break.

In addition to a capacitance forming region in which the plurality of dielectric layers, the plurality of first inner electrodes, and the plurality of second inner electrodes are laminated together, a lower protective region including a dielectric layer is preferably provided on the first principal surface side of the capacitor main body and a dummy inner electrode not connected to the first via conductors and the second via conductors is preferably provided inside the lower protective region, for example. In this case, the strength of the capacitor main body on the first principal surface side is able to be significantly improved.

In addition to the capacitance forming region in which the plurality of dielectric layers, the plurality of first inner electrodes, and the plurality of second inner electrodes are laminated together, an upper protective region including a dielectric layer is preferably provided on the second principal surface side of the capacitor main body and a dummy inner electrode not connected to the first via conductors and the second via conductors is preferably provided inside the upper protective region, for example. In this case, the strength of the capacitor main body on the second principal surface side is able to be significantly improved.

In addition to the capacitance forming region in which the plurality of dielectric layers, the plurality of first inner electrodes, and the plurality of second inner electrodes are laminated together, a lower protective region including a dielectric layer is preferably provided on the first principal surface side of the capacitor main body and the first via conductors and the second via conductors preferably pass through the capacitance forming region, for example. In this case, the multilayer capacitor is able to be produced easily.

The surface roughness of the first principal surface preferably differs from the surface roughness of the second principal surface and the surface roughness of the first principal surface is preferably larger than the surface roughness of the second principal surface, for example. In this case, the multilayer capacitor is able to be bonded to, for example, a substrate with high bonding strength.

In addition to the capacitance forming region in which the plurality of dielectric layers, the plurality of first inner electrodes, and the plurality of second inner electrodes are laminated together, a lower protective region including a dielectric layer is preferably provided on the first principal surface side of the capacitor main body and the composition of the dielectric layers in the capacitance forming region preferably differs from the composition of the dielectric layer in the lower protective region, for example. In this case, the first principal is easily able to be formed with a larger surface roughness than the second principal surface.

A cut adhesive sheet is preferably applied to the first principal surface, for example. In this case, the adhesive sheet may mount (fix) the multilayer capacitor.

A multilayer capacitor array preferably includes a carrier sheet; an adhesive layer provided on one of principal surfaces of the carrier sheet; and a plurality of the multilayer capacitors described above. The plurality of multilayer capacitors are bonded to the carrier sheet with the first principal surfaces of the multilayer capacitors bonded to the adhesive layer. In this case, the multilayer capacitor array is able to be provided to, for example, store, and transport the multilayer capacitors.

In this multilayer capacitor array, the carrier sheet is preferably stretchable in a plane direction, for example. In this case, the multilayer capacitors are able to be easily detached from the multilayer capacitor array.

The adhesive layer is preferably an adhesive sheet having adhesiveness on both sides, for example. In this case, the multilayer capacitors are able to be easily bonded to the adhesive layer.

The adhesive sheet is preferably stretchable in a plane direction, for example. In this case, the multilayer capacitors are able to be easily detached from the multilayer capacitor array.

Preferably, for example, when the adhesive sheet is cut into cut adhesive sheets, each cut adhesive sheet is provided with a corresponding one of the multilayer capacitors, and then the multilayer capacitors are peeled off from the carrier sheet, the multilayer capacitors are peeled off from the carrier sheet with the cut adhesive sheets adhering to the respective multilayer capacitors. In this case, the cut adhesive sheets may mount (fix) the multilayer capacitors.

The plurality of multilayer capacitors are preferably spaced apart from each other, for example. In this case, the plurality of multilayer capacitors do not come into contact with each other on the carrier sheet and are prevented from being broken.

The multilayer capacitor array according to one of the preferred embodiments of the present invention may be provided not only for storage and transportation of the multilayer capacitors but also for storage and transportation of other electronic components. The inventors of preferred embodiments of the present invention have invented a technical idea about an electronic component array which includes a carrier sheet, an adhesive layer provided on one of principal surfaces of the carrier sheet, and a plurality of electronic components and in which the plurality of electronic components are bonded to the carrier sheet with their first principal surfaces (principal surfaces with no outer electrodes formed thereon) bonded to the adhesive layer. In this electronic component array, the carrier sheet is preferably stretchable in a plane direction, for example. In this case, the electronic components are able to be easily detached from the electronic component array. The adhesive layer is preferably an adhesive sheet having adhesiveness on both sides, for example. In this case, the electronic components are able to be easily bonded to the adhesive layer. The adhesive sheet is preferably stretchable in a plane direction, for example. In this case, the electronic components are able to be easily detached from the electronic component array. Preferably, for example, when the adhesive sheet is cut into cut adhesive sheets, each cut adhesive sheet is provided with a corresponding one of the electronic components and the electronic components are peeled off from the carrier sheet. The electronic components are peeled off from the carrier sheet with the cut adhesive sheets adhering to the respective electronic components. In this case, the cut adhesive sheets may mount (fix) the electronic components. The plurality of electronic components are preferably spaced apart from each other, for example. In this case, the plurality of electronic components do not come into contact with each other on the carrier sheet and are prevented from being broken. Any type of electronic components may be included, and various electronic components, for example, capacitors, inductors, resistors, and LC composite components may be included to produce an electronic component array.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A multilayer capacitor comprising:
   a capacitor main body including a plurality of dielectric layers, a plurality of first inner electrodes, and a plurality of second inner electrodes that are laminated together;
   a plurality of first outer electrodes and a plurality of second outer electrodes provided on an outer surface of the capacitor main body;

a plurality of first via conductors that electrically connect the plurality of first outer electrodes to the plurality of first inner electrodes; and
a plurality of second via conductors that electrically connect the plurality of second outer electrodes to the plurality of second inner electrodes; wherein
through holes are provided in the plurality of second inner electrodes, the plurality of first via conductors passing through the through holes with the plurality of first via conductors insulated from the plurality of second inner electrodes;
through holes are provided in the plurality of first inner electrodes, the plurality of second via conductors passing through the through holes with the plurality of second via conductors insulated from the plurality of first inner electrodes;
the capacitor main body includes a first principal surface and a second principal surface that are opposite outer surfaces of the capacitor main body;
the plurality of first outer electrodes and the plurality of second outer electrodes are not provided on the first principal surface and are only provided on the second principal surface;
a capacitance region is defined by a region in which the plurality of dielectric layers, the plurality of first inner electrodes, and the plurality of second inner electrodes are laminated together;
a lower protective region including a dielectric layer is provided on the first principal surface side of the capacitor main body;
a dummy inner electrode not connected to the plurality of first via conductors and the plurality of second via conductors is provided inside the lower protective region;
no through holes through which the plurality of first and second via conductors pass are provided in the dummy inner electrode; and
the dummy inner electrode is not configured to provide electrostatic capacitance in the multilayer capacitor.

2. The multilayer capacitor according to claim 1, wherein the plurality of dielectric layers are ceramic layers.

3. The multilayer capacitor according to claim 1, wherein, inside the capacitor main body, a distance between one of the plurality of first via conductors and one of the plurality of second via conductors that are located closest to each other is about 400 µm or less.

4. The multilayer capacitor according to claim 1, wherein
the plurality of first outer electrodes are at least partially embedded in the second principal surface;
end portions of the plurality of first via conductors that are located on the second principal surface side of the capacitor main body are embedded in bottom surfaces of the plurality of first outer electrodes;
the plurality of second outer electrodes are partially embedded in the second principal surface; and
end portions of the plurality of second via conductors that are located on the second principal surface side of the capacitor main body are embedded in bottom surfaces of the plurality of second outer electrodes.

5. The multilayer capacitor according to claim 1, wherein
the plurality of first outer electrodes are at least partially embedded in the second principal surface;
a protrusion is provided on a portion of a bottom surface of each of the plurality of first outer electrodes and embedded in a hole in which a corresponding one of the plurality of first via conductors is provided, the protrusion being electrically connected to the corresponding one of the plurality of first via conductors;
the plurality of second outer electrodes are at least partially embedded in the second principal surface; and
a protrusion is provided on a portion of the bottom surface of each of the plurality of second outer electrodes and embedded in a hole in which a corresponding one of the plurality of second via conductors is provided, the protrusion being electrically connected to the corresponding one of the plurality of second via conductors.

6. The multilayer capacitor according to claim 1, wherein
an upper protective region including a dielectric layer is provided on the second principal surface side of the capacitor main body; and
a dummy inner electrode not connected to the plurality of first via conductors and the plurality of second via conductors is provided inside the upper protective region.

7. The multilayer capacitor according to claim 1, wherein the plurality of first via conductors and the plurality of second via conductors pass through the capacitance region.

8. The multilayer capacitor according to claim 1, wherein
a surface roughness of the first principal surface differs from a surface roughness of the second principal surface; and
the surface roughness of the first principal surface is larger than the surface roughness of the second principal surface.

9. The multilayer capacitor according to claim 1, wherein materials included in the dielectric layers in the capacitance region are at least partially different from materials included in the dielectric layer in the lower protective region.

10. The multilayer capacitor according to claim 1, wherein a cut adhesive sheet is applied to the first principal surface.

11. A multilayer capacitor array comprising:
a carrier sheet;
an adhesive layer provided on one of principal surfaces of the carrier sheet; and
a plurality of the multilayer capacitors according to claim 1; wherein
the plurality of multilayer capacitors are attached to the carrier sheet with the first principal surfaces of the multilayer capacitors bonded to the adhesive layer.

12. The multilayer capacitor array according to claim 11, wherein the carrier sheet is stretchable in a plane direction.

13. The multilayer capacitor array according to claim 11, wherein the adhesive layer is an adhesive sheet having adhesiveness on both sides.

14. The multilayer capacitor array according to claim 13, wherein the adhesive sheet is stretchable in a plane direction.

15. The multilayer capacitor array according to claim 13, wherein
when the adhesive sheet is cut into cut adhesive sheets, each cut adhesive sheet is provided with a corresponding one of the plurality of multilayer capacitors and the plurality of multilayer capacitors are peeled off from the carrier sheet; and
the plurality of multilayer capacitors are peeled off from the carrier sheet with the cut adhesive sheets adhering to the plurality of multilayer capacitors.

16. The multilayer capacitor array according to claim 11, wherein the plurality of multilayer capacitors are spaced apart from each other.

17. The multilayer capacitor according to claim 1, wherein each of the plurality of first outer electrodes and the plurality of second outer electrodes includes a base layer and a plating layer provided on an outer surface of the base layer.

18. The multilayer capacitor according to claim 1, wherein the plurality of dielectric layers are resin layers.

19. The multilayer capacitor according to claim 3, wherein each of the plurality of first via conductors and each of the plurality of second via conductors has a diameter between about 30 μm to about 150 μm.

* * * * *